T 859,008

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED FEBRUARY 4, 1969

859 O.G. 42

764,017

PLASTICIZED TOBACCO SMOKE FILTER

George P. Touey and Cephas H. Sloan, both of P. O. Box 511, Kingsport, Tenn. 37662

Continuation of application Ser. No. 650,656, July 3, 1967. This application Sept. 18, 1968. Published Feb. 4, 1969

Class 131—267

No Drawing. 20 Pages Specification

A tobacco smoke filter comprising a cellulose ester and containing a plasticizer blend of triacetin and a poly(ethylene glycol) diacetate wherein the triacetin content ranges from 40% to 60% and the poly(ethylene glycol) diacetate is selected from the group consisting of di-, tri-, tetra,-penta-, and hexaethylene glycol diacetate.